United States Patent
Mo et al.

(10) Patent No.: US 9,432,470 B2
(45) Date of Patent: Aug. 30, 2016

(54) METHOD AND APPARATUS FOR SENDING AUTHENTICATION REQUEST MESSAGE IN A SOCIAL NETWORK

(71) Applicant: Alibaba Group Holding Limited, Grand Cayman (KY)

(72) Inventors: Jianxiang Mo, Hangzhou (CN); Jun Ye, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 360 days.

(21) Appl. No.: 14/035,594

(22) Filed: Sep. 24, 2013

(65) Prior Publication Data
US 2014/0047030 A1    Feb. 13, 2014

Related U.S. Application Data

(63) Continuation of application No. 12/867,858, filed as application No. PCT/US2010/033900 on May 6, 2010, now Pat. No. 8,566,396.

(30) Foreign Application Priority Data

Jun. 12, 2009   (CN) .......................... 2009 1 0147250

(51) Int. Cl.
G06F 15/16     (2006.01)
H04L 29/08     (2006.01)
(Continued)

(52) U.S. Cl.
CPC ............. *H04L 67/22* (2013.01); *H04L 12/588* (2013.01); *H04L 51/32* (2013.01); *H04L 63/104* (2013.01)

(58) Field of Classification Search
CPC ... H04L 67/22; H04L 63/104; H04L 12/588; H04L 51/32
USPC ........................................................ 709/204
See application file for complete search history.

(56) References Cited

U.S. PATENT DOCUMENTS 7,188,153 B2   3/2007  Lunt et al.
7,433,832 B1   10/2008 Bezos et al.
(Continued)

FOREIGN PATENT DOCUMENTS

CN   101237426    8/2008
JP   2003030361   1/2003
(Continued)

OTHER PUBLICATIONS

Hamasaki, et al., "A Study of an Introduction Assistance for Social Matching", Intelligence and Information (Proceedings of Japan Society for Fuzzy Theory and Intelligent Informatics), vol. 20, No. 4, pp. 578-590, Aug. 2008.
(Continued)

Primary Examiner — Jerry Dennison
(74) Attorney, Agent, or Firm — Lee & Hayes, PLLC

(57) ABSTRACT

The present disclosure describes a method and an apparatus for sending an authentication request message in a social network. In order to resolve the problem that there are few parameters to be relied on when a user authenticates a request seeking to establish a social network relationship with the user, the method disclosed by the present disclosure includes: a social network server that, after obtaining an authentication request message sent by a first client to a second client to request to establish a social network relationship, modifies the first client's identification information in the first authentication request message to a third client's identification information to obtain a second authentication request message. The third client has a social network relationship with the first client and also has a direct social network relationship with the second client. The second authentication request message is sent to the second client. As the third client's identification information is used as identification information of a sending party in the second authentication request message that is sent to the second client, there will be more parameters for use when the second client verifies the request to establish the social network relationship.

14 Claims, 3 Drawing Sheets

(51) Int. Cl.
*H04L 12/58* (2006.01)
*H04L 29/06* (2006.01)

(56) References Cited

U.S. PATENT DOCUMENTS

| | | | |
|---|---|---|---|
| 7,533,832 B2 | 5/2009 | Price et al. | |
| 7,610,627 B1* | 10/2009 | McKenna | G06F 21/62 |
| | | | 713/168 |
| 7,664,669 B1 | 2/2010 | Adams et al. | |
| 7,778,890 B1* | 8/2010 | Bezos | G06Q 10/10 |
| | | | 705/26.1 |
| 7,930,255 B2 | 4/2011 | Choi et al. | |
| 7,945,862 B2 | 5/2011 | Aldrich et al. | |
| 7,992,210 B2 | 8/2011 | McKenna | |
| 8,180,689 B2 | 5/2012 | Bezos et al. | |
| 8,214,301 B2 | 7/2012 | Samuel et al. | |
| 8,229,782 B1 | 7/2012 | Adams et al. | |
| 8,239,364 B2 | 8/2012 | Wable et al. | |
| 8,566,396 B2* | 10/2013 | Mo | H04L 12/588 |
| | | | 709/204 |
| 2003/0212790 A1 | 11/2003 | Thambidurai et al. | |
| 2003/0220980 A1* | 11/2003 | Crane | H04L 63/08 |
| | | | 709/207 |
| 2004/0103306 A1* | 5/2004 | Paddock | G06F 21/6245 |
| | | | 726/28 |
| 2004/0128378 A1* | 7/2004 | Blakley, III | G06F 21/41 |
| | | | 709/224 |
| 2006/0259957 A1 | 11/2006 | Tam et al. | |
| 2007/0162458 A1 | 7/2007 | Fasciano | |
| 2007/0192299 A1 | 8/2007 | Zuckerberg et al. | |
| 2008/0127318 A1 | 5/2008 | Adler | |
| 2008/0163075 A1 | 7/2008 | Beck et al. | |
| 2008/0201447 A1 | 8/2008 | Kim | |
| 2008/0270038 A1 | 10/2008 | Partovi et al. | |
| 2009/0024548 A1 | 1/2009 | Zhu et al. | |
| 2009/0144075 A1 | 6/2009 | Flinn et al. | |
| 2009/0171686 A1* | 7/2009 | Eberstadt | G06Q 10/10 |
| | | | 705/319 |
| 2009/0271370 A1* | 10/2009 | Jagadish | G06Q 10/10 |
| 2009/0320101 A1 | 12/2009 | Doyle, III et al. | |
| 2009/0328173 A1 | 12/2009 | Jakobson et al. | |
| 2010/0004940 A1* | 1/2010 | Choi | G06Q 10/10 |
| | | | 705/1.1 |
| 2010/0011205 A1 | 1/2010 | McKenna | |
| 2010/0020952 A1 | 1/2010 | Leung et al. | |
| 2010/0037288 A1 | 2/2010 | Carraher et al. | |
| 2010/0180032 A1 | 7/2010 | Lunt | |
| 2010/0280904 A1 | 11/2010 | Ahuja | |
| 2011/0078190 A1 | 3/2011 | Samuel et al. | |
| 2011/0161478 A1 | 6/2011 | Formo et al. | |
| 2012/0206464 A1 | 8/2012 | Kim et al. | |
| 2013/0073975 A1* | 3/2013 | Bladel | G06F 21/31 |
| | | | 715/739 |

FOREIGN PATENT DOCUMENTS

| | | |
|---|---|---|
| JP | 2007328723 | 12/2007 |
| JP | 2008186284 | 8/2008 |

OTHER PUBLICATIONS

Translated Japanese Office Action mailed Mar. 4, 2014 for Japanese patent application No. 2012-514964, a counterpart foreign application of U.S. Pat. No. 8,566,396, 8 pages.

Chinese Office Action mailed Mar. 9, 2011 for Chinese patent application No. 200910147250.7, a counterpart foreign application of U.S. Appl. No. 12/867,858, 8 pages.

Non-Final Office Action for U.S. Appl. No. 12/867,858, mailed on Mar. 14, 2013, Jianxiang Mo et al., "Method and Apparatus for Sending Authentication Request Message in a Social Network", 11 pages.

* cited by examiner

METHOD AND APPARATUS FOR SENDING AUTHENTICATION REQUEST MESSAGE IN A SOCIAL NETWORK

CROSS REFERENCE TO RELATED PATENT APPLICATIONS

This application is a continuation application which claims priority to commonly assigned, co-pending U.S. patent application Ser. No. 12/867,858, filed Aug. 16, 2010, which is the national stage application of an international patent application PCT/US10/33900, filed May 6, 2010, which claims priority from Chinese Patent Application No. 200910147250.7, filed Jun. 12, 2009, entitled "METHOD AND APPARATUS FOR SENDING AUTHENTICATION REQUEST MESSAGE IN A SOCIAL NETWORK," which applications are hereby incorporated in their entirety by reference.

TECHNICAL FIELD

The present disclosure relates to internet technology field and, more particularly, to a method and apparatus for sending an authentication request message in a social network.

BACKGROUND

In the current Internet-based environment, the social network formed by online netizens has evolved beyond the simple connection between individual subscribers, and involves one-to-many and many-to-many relationships. A social network includes online users and their related networks, such as instant message (IM) systems and Internet SNS (Social Network Service) communities based on WEB2.0. Taking an IM application for example, before its subscribers intercommunicate and exchange information through their respective IM subscriber ends, the IM application typically requires certain bilateral social network relationship between the subscribers who are about to communicate with each other, in order to accelerate orientation of communicating parties and prevent subscribers from sending spam information and/or harassing messages. With the current IM software technology, if user A initiates a communication with user B who is not on a list of user A's social network relationships, or if user A requests to establish a certain social relationship with user B, user A sends an authentication request message to user B through a server system. (The authentication request message includes a textual description and user A's identification information. The identification information is used to identify a sender who sends the authentication request message. The textual description is used to express a request to establish a social network relationship with user B.) User B decides whether to establish the social network relationship with user A or not based on the authentication request message. If user B agrees then a social network relationship between user A and user B is established. If user B does not agree then a social network relationship between user A and user B cannot be established. Only after user B verifies user A's request, can user A find user B in user A's list of social network relationships, and begin to communicate and chat with user B.

When user A requests to become a user who has certain social network relationship with user B, user B can only determine, through user A's authentication request message, whether or not to establish the social network relationship with user A. Thus, under the current technologies, when user B verifies the request to establish a social network relationship with him/her, user B can only depend on the information in user A's textual description in the authentication request message forwarded by the server system to user B to make the determination. Accordingly, user B faces a problem of low authentication reliability.

SUMMARY

In order to resolve the low reliability problem when users verify requests to establish a social network relationship, the present disclosure provides a method for sending an authentication request message in a social network. The method includes actions described below.

A social network server receives a first authentication request message from a first client to establish the social network relationship with a second user. The first authentication request message includes identification information of the first client.

The social network server modifies the identification information of first client to identification information of a third client to obtain a second authentication request message, where the third client has a social network relationship with the first client and also has a direct social network relationship with the second client.

The social networking server sends the second authentication request message to the second client.

The present disclosure also provides an apparatus for sending an authentication request message in a social network. The apparatus includes components described below.

A receiving module—The receiving module receives a first authentication request message sent by a first client to request to establish a social network relationship with a second client. The first authentication request message includes a first client's identification information identifying a sender.

A modification module—The modification module modifies the first client's identification information to third client identification information to obtain a second authentication request message. The third client has a social network relationship with the first client and also has a direct social network relationship with the second client.

A first sending module—The first sending module sends the second authentication request message to the second client.

As shown from the above implementations, because the third client identification information is used for identification of the sending party in the second authentication request message sent to the second client, the second client can rely on more parameters when verifying the request to establish new social network relationship.

DESCRIPTIONS OF DRAWINGS

DETAILED DESCRIPTION

Figure 1:
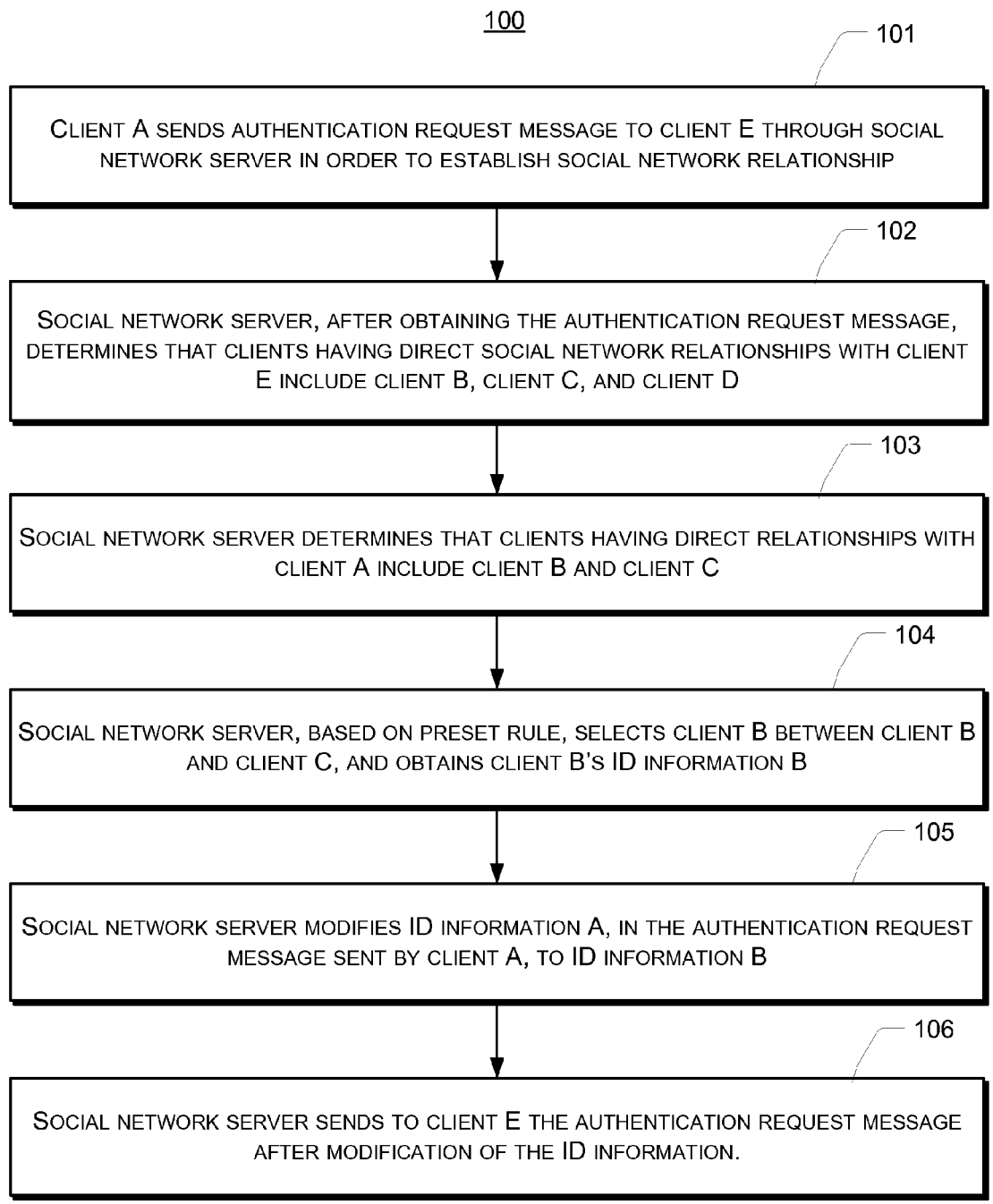
FIG. 1 shows a flowchart of a method in accordance with a first exemplary embodiment of the present disclosure.

A first exemplary embodiment disclosed by the present disclosure is a method 100 for sending an authentication request message in a social network. A flowchart of the method 100 is shown in FIG. 1. The method includes actions as described below.

At 101, client A sends an authentication request message to client E through the social network server in order to establish a social network relationship with client E. The authentication request message sent by client A includes client A's identification information A.

At 102, a social network server, after obtaining the authentication request message, determines that clients who have direct social network relationships with client E include client B, client C, and client D.

At 103, the social network server determines that clients who have direct relationships with client A include client B and client C.

At 104, the social network server, based on a preset rule, selects client B from client B and client C, and obtains client B's identification information B.

At 105, the social network server modifies the identification information A that is included in the authentication request message sent by client A into identification information B.

At 106, the social network server sends to client E the authentication request message with the modified of identification information.

In the step 101, client A and client E can be clients in an IM system, or clients in a web 2.0 based Internet SNS. As an example of IM tools, if a user 1 uses client A to communicate with a user 2 who is not on a list of user 1's social network relationship, or if user 1 requests to establish a certain social network relationship with user 2, then user 1 first inputs a textual description in a dialog box provided by client A to express his/her request to establish the social network relationship with user 2. Afterwards, together with the identification information of user 1, the textual description input by user 1 becomes part of the authentication request message to be sent to user 2 through client A. User 2 receives the authentication request message through client E.

Client E has a list of social network relationships. For example, the list of social network relationships in Table 1, shown below, has three client identifications and their corresponding social network relationship categories, indicating that client B, client C and client D have social network relationships with client E and that their social network relationship category is 1. For instance, a network social relationship category 1 represents a "good friend relationship." Of course, depending on specific needs, client E can also have several lists of social network relationships, each representing an associated relationship between different client identifications and different social network relationship categories. For example, client E not only has Table 1 but also Table 2, as shown below. In Table 2, the social network relationship category is 2, indicative of an "acquaintance relationship." Each client of the social network has stored a list similar to that of client E, which is used to store client identifications of clients who have social network relationship with this particular client, as well as corresponding social network relationship categories.

TABLE 1

| Client identification | Social Network Relationship Category |
|---|---|
| B | 1 |
| C | 1 |
| D | 1 |

TABLE 2

| Client identification | Social Network Relationship Category |
|---|---|
| F | 2 |
| G | 2 |

Based on the user's needs, client A sends, through the social network server, the authentication request message to client E to join Table 1. It is understood that the user's application needs may be different so that client A can also send to client E through the social network server the authentication request message to join Table 2. The authentication request message includes: identification information A, identification information E, and some textual description to request client E to add client A to the list of social network relationship Table 1. Identification information A is used to identify the sending party. Textual description may be something such as "request to join the social network relationship list 1," for example. Identification information E is used to identify the receiving party. In this example, client E will receive the authentication request message which includes the identification of the sending party, client A, and textual description of "request to join the social network relationship list 1."

Client E has direct social network relationships with client B, client C, and client D. If client B's social network relationship list includes client identification H, and client E's social network relationship list does not include client identification H, then client E and client H have a social network relationship, albeit not a direct social network relationship.

The social network server can be installed in any server in the social network, such as server 1, server 2, or server 3 in the social network. This server needs to be able to receive the authentication request message sent by client A through the network.

In the step 102, after receiving the authentication request message sent by client A, the social network server analyzes the authentication request message and obtains identification information E of the receiving party from the authentication request message. The social network server's database stores a Table 1' with the same contents as Table 1. Based on Table 1' that has the same contents as table 1 and is stored in the social network server, the social network server determines that clients who have direct social network relationships with client E are client B, client C, and client D. In this step, the social network server can search to obtain clients who have direct social network relationship with client E, which are client B, client C, and client D. It is understood that to further improve efficiency and to increase parameters relied on by the authentication message, the social network server, after obtaining the authentication request message sent by client A to establish the social network relationship with client E, can also obtain identification information A and identification information E. After receiving the authentication request message sent by the client with identification information A, the social network server analyzes the authentication request message, and obtains identification information A and identification information E from the authentication request message. Based on identification information A and identification information E, the social network server determines from multiple servers that a server storing an inverted index in which the keyword for storage index is (A-E), "AE", "(AE)", and so on to be server 1. The use of multiple servers is due to a scale of millions of users in the social network. Thus, this exemplary embodiment uses distributed servers to pre-store the inverted index. Of course, pre-storing inverted index is just a preferred implementation. This exemplary embodiment can also establish the inverted index after obtaining identification information A and E.

The inverted index is usually also referred to as reverse index, embedded file or inverted file, and is an indexing method generally used to store a mapping of a position (index field value) of a respective word (such as a keyword in index) stored in a file or a group of files in a full text search. The inverted index file in the present exemplary embodiment uses mutually bound identification information A and identification information E (where (A-E) represents the mutually bound identification information A and identification information E) as an index key. If the key is (A-E), it uses common social attribute information of clients, identification information A and identification information E, as an index value. The social attribute information shows an attribute of a social network user bound with a client in the social network.

The social attribute information can be registered by a user when the user joins the social network, such as for example: a location when the user registered the social network, the city of Hangzhou, and a company name, Company A. The social attribute information can also be information generated from an activity in the social network, such as for example: belonging to a group of World of Warcraft. The social attribute information can also be obtained, for example, from the user's logs, or from a database that stores the user registration information. Afterwards, common social attribute information can be obtained from the social attribute information of different users. In the above example, an index value may be {"Location-"→"Hangzhou", "Company"→"Company A", "Gender-"→"male", "Industry"→"electronics", "Game Name-"→"World of Warcraft"}. The inverted index file stored in server 1 is shown in Table 3 below.

TABLE 3

| KEY | VALUE |
| --- | --- |
| (A-B) | {"Location" → "Hangzhou", "Company" → "Company A", "Gender" → "male', "Industry" → "electronics", "Game Name" → "World of Warcraft"} |
| (A-C) | {"Location" → "Hangzhou", "Company" → "Company A", "Gender" → "male', "Industry" → "electronics", "Sports" → "soccer"} |
| (A-D) | {"Location" → "Hangzhou", "Company" → "Company A", "Gender" → "male', "IP" → "196.168.0.*", "Game Name" → "World of Warcraft"} |
| (A-E) | {"Location" → "Hangzhou", "Company" → "Company A", "Gender" → "male', "Occupation" → "sales", "Game Name" → "World of Warcraft"} |

The social network server extracts identification information A and identification information E from the authentication request message to obtain (A-E). The social network server also identifies server 1, from among servers 1, 2, and 3 that store inverted indexes, as the server that stores the inverted index of which index keyword is (A-E). Alternatively, there may be only one server that stores the inverted index of which index keyword includes (A-E), "AE", or "(AE)," which is server 1. The social network server then extracts an index record of which the keyword is (A-E), and the common social attribute information between client A and client E, from server 1. Specifically, the social network server extracts from Table 3 an index record of which the keyword is (A-E) and corresponding value (the common social attribute information between client A and client E) {"Location"→"Hangzhou", "Company"→"Company A", "Gender"→"male', "Occupations"→"sales", "Game Name-"→"World of Warcraft"}.

Furthermore, in order to increase efficiency and parameters relied on by the authentication request, the social network server can similarly extract from server 1 the index record of which keyword is (A-E) and a relationship chain information between client A and client E. The inverted index uses mutually bound identification information A and identification information E (where (A-E) represents the mutually bound identification information A and identification information E) as an index key, and the relationship chain information between client A and client E as an index value. The relationship chain information indicates there is indirect social network relationship between the two clients. For example, there is a certain social network relationship between the client of which identification information is A and the client of which identification information is B, in which the relationship category is 2. There is a certain social network relationship between client B and client E, in which the relationship category is 1. A value of an index with (A-E) being the key is {(A-B, relationship type 2), (B-E, relationship type 1)}. Likewise, there is a certain social network relationship between client A and client C, in which the relationship category is 2. There is a certain social network relationship between client C and client E, in which the relationship category is 1. Another value of the index with (A-E) being the key is {(A-C, relationship 2), (C-E, relationship 1)}. The inverted index file stored in server 1 is shown below in Table 4.

TABLE 4

| Key | VALUE |
| --- | --- |
| (A-E) | {(A-B, relationship type 2), (B-E, relationship type 1)}; {(A-C, relationship type 2), (C-E, relationship type 1)} |
| (A-D) | {(A-B, relationship type 2), (B-D, relationship type 1)}; |

Alternatively, based on identification information A and identification information E, the social network server identifies, from among the multiple servers that store inverted indexes, server 1 as the server that stores index record of which the keyword is A and server 2 as the server that stores index record of which the keyword is E. Of course, if the inverted index is stored in only one server, then there is no need to make such determination. For example, if all the index records are stored in server 1 of the social network, the index records regardless whether its keyword is A or E are extracted from server 1.

In this exemplary embodiment, the social network server extracts from server 1 the social attribute information of the client of which identification information is A from the index records of which the keyword is A, extracts from server 2 the social attribute information of the client of which identification information is E, and extracts a common social attribute information between the client of which identification information is A and the client of which identification information is E.

In this exemplary embodiment, the pre-stored inverted index uses each identification information as index key and social attribute information of respective client identification as a corresponding index value. For example, identification information A is used as key and the social attribute information of the client of which the identification information is A is used as the corresponding value. Identification information E is used as key and the social attribute information of the client of which the identification information is E is used as the corresponding value.

The value of index of which the key is identification information A is {"Location"→"Hangzhou", "Company"→"Company A", "Gender"→"male", "Industry"→"electronics", "Game name"→"Warcraft World", "Sports"→"soccer", "Occupation"→"sales", and etc.}. The value of index of which the key is identification information E is {"Location"→"Hangzhou", "Company"→"Company A", "Gender"→"male", "Industry"→"electronics", "Game name"→"Warcraft World", "Sports"→"table tennis", "Occupation"→"financial officer", and etc}. The social network server finds the common portions from the two values and that is {"Location"→"Hangzhou", "Company"→"Company A", "Gender"→"male", "Game name"→"Warcraft World"}.

In the step 103, after receiving the authentication request message sent by client A, the social network server analyzes the authentication request, extracts identification information A of the sending party from the authentication request message, and determines that client B and client C have direct social network relationship with client A based on client A's social network relationship list, shown in Table 5, that is stored in the social network server.

TABLE 5

| Client identification | Social Network Relationship Category |
|---|---|
| B | 1 |
| C | 1 |

Figure 2:
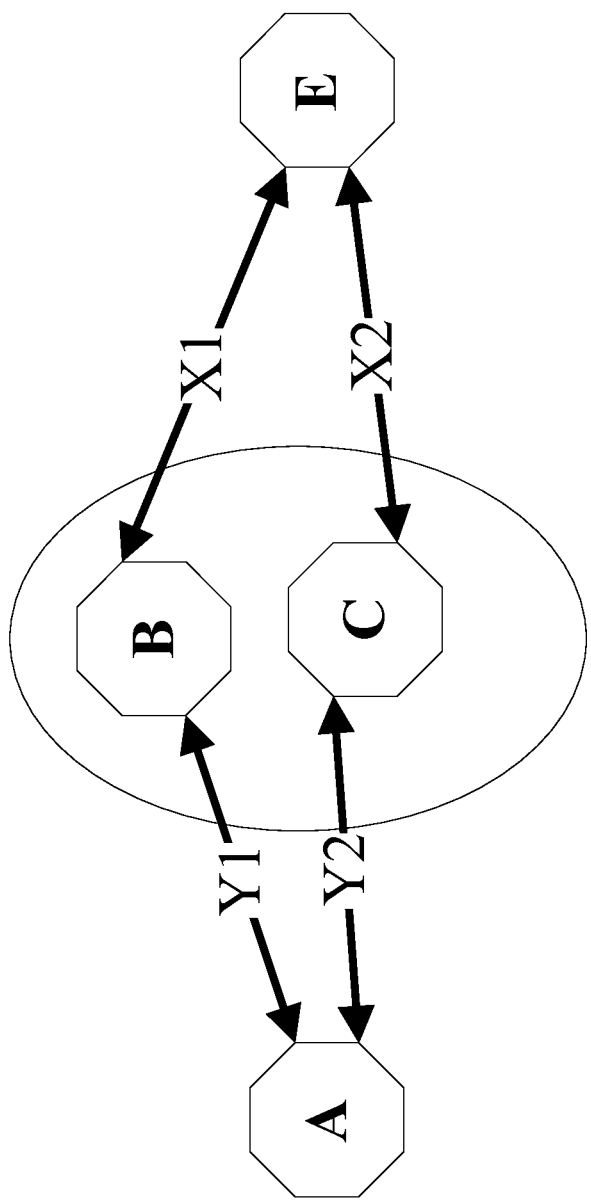
FIG. 2 shows a social network chain diagram in accordance with the first exemplary embodiment of the present disclosure.

In this step, the social network server can find the clients having direct social network relationship with client A from the pre-stored Table 5 in the database, which are client B and C. It can thus determine that clients having direct social network relationships with clients A and E are clients B and C. Client A and client E have a social network chain as shown in FIG. 2.

As a preferred embodiment, client B and client C have direct social network relationships with client A. At the same time, client B and client C also have direct social network relationships with client E. Certainly, it could be that client B and client C have direct social network relationships with client E while client B and client C have social network relationships instead of direct social network relationships with client A.

In the step 104, the social network server automatically calculates a social network chain between client A and client E that has the highest total degree of familiarity. For example, a degree of familiarity of a social network chain client A→client B→client E is Y1+X1 and a degree of familiarity of another social network client A→client C→client E is Y2+X2. If Y1+X1>Y2+X2, then the social network server chooses client B from client B and client C, and obtains client B's identification information B. Otherwise, the social network server chooses client C. This present exemplary embodiment chooses client B as a preferred implementation. In this step, it uses a degree of familiarity to select client B or client C. Certainly the social network server can select either one of client B and client C without relying on the degree of familiarity.

Alternatively, the social network server chooses between client B and client C based on a number of client identifications in client B's social network relationship list and client C's social network relationship list. For example, the number of client identifications in client B's social network relationship list may be 10 while a number of client identifications in client C's social network relationship list may be 100. Because the number of client identifications in client B's social network relationship list is less than that of client C, it is probable that client B is more cautious in selecting his/her social network parties. Client B is thus chosen. Certainly, client B can also be chosen because client E accounts for 1/10 of client B's social network relationship list while client E accounts for 1/100 of client C's social network relationship list. Certainly the social network server can establish a threshold such as 1/20. Client B is chosen because client E accounts for 1/10 of client B's social network relationship list, a percentage that is higher than the threshold of 1/20, while client E accounts for 1/100 of client C's social network relationship list, a percentage that is lower than the threshold of 1/20.

Alternatively, the social network server automatically chooses one between client B and client C that has a higher degree of familiarity with client E: If X1>X2, then the social network server chooses client B; otherwise chooses client C. For illustrative purpose, this exemplary embodiment uses client B as the preferred implementation.

Certainly, in addition to using preset rules to choose client B as described with respect to the step 104, the social network server can also send the identification information B and C of clients B and C, respectively, to client A. If client A chooses C then the social network server chooses client C based on client A's choice. Otherwise, if client A chooses B then the social network server chooses client B based on client A's choice.

The degree of familiarity can be obtained as follows. Suppose that a time during which two clients have the social network relationship is N (e.g. 30 days), a corresponding value of degree of familiarity for a standard unit time (e.g. 1 day) is M, a time weighted value of degree of familiarity is N*M. Moreover, suppose that a degree of familiarity value of two clients exchanging information once within the standard unit time is P, a maximum value of degree of familiarity of two clients exchanging information within the standard unit time is Pmax, where Pmax<P*Y, with Y being a maximum number of times that two clients exchange information within the standard unit time. For example, assuming that the standard unit time is 1 day, and there are 90 instances of information exchange in the standard unit time, then Pmax=90P.) Therefore, a degree of familiarity between the two clients can be calculated as: X1=N1*M1+Min(Y*P, Pmax).

In the step 105, after the social network server receives the authentication request message sent by client A, the social network server searches identification information A in the authentication request message and modifies it to identification information B. The modified authentication request message includes: identification information B and some modified textual description. Identification information B is used to identify a sending party of the modified authentication request message. The modified textual description can be, for example: "client A requests to join the social relationship list 1". Thus, the modified authentication request message includes the following indication: client identification of the sending party=B and textual description="client A requests to be included in the social relationship list 1."

In the step 106, the social network server sends to client E the authentication request message with modified identification information, including identification information B and some textual description in the authentication request message originally sent by client A to request client E to add client A to the social network relation list 1. If the social network server selects client B according to the preset rules, the social network server can first send to client B the authentication request message with the modified identification information. The social network server, after receiving OK confirmation information replied by client B, sends to client E the authentication request message with modified identification information. Otherwise, the social network server does not send to client E the authentication request message with the modified identification information.

Furthermore, if in the step 102 the social network server extracts the common social attribute information between client A and client E, then the social network server obtains the mutually bound (A-E) based on the received identification information A and identification information E in the authentication request message sent by client A, and the common social attribute information between client A and client E from Table 3. The authentication request message sent by the social network server to client E includes the common social attribute information between client A and client E. The social network server sends to client E the extracted {"Location"→"Hangzhou", "Company"→"Company A", "Gender"→"male', "Profession"→"sales", "Game Name"→"World of Warcraft"}. Through {"Location"→"Hangzhou", "Company"→"Company A", "Gender"→"male', "Profession"→"Sales", "Game Name"→"World of Warcraft"}, it shows that the user bound with client A and the user bounded with client E have common attribute information in the social network.

At the same time, the social network server forwards the authentication request message to client E. The authentication request message carries the common social attribute information {"Location"→"Hangzhou", "Company"→"Company A", "Gender"→"male', "Profession"→"sales", "Game Name"→"World of Warcraft"} in the authentication request message. Certainly the social network server can send to client E the authentication request message and the common social attribute information separately. The authentication request message and the common social attribute information carry information that they are bound with each other so that the client of which identification information is E can know to which authentication request message the received common social attribute information corresponds, and authenticates the authentication request message according to this common social attribute information. Client E will display the received common social attribute information between client A and E. Client E can use a form of social relationship authentication message box to receive the authentication request message sent by client A to request to establish the social relationship, and display it in the social relationship authentication message box.

If in the step 102 the social network server extracts the social relationship chain information between client A and client E, then the social network server obtains the mutually bound (A-E) based on the received identification information A and identification information E in the authentication request message sent by client A, and the social relationship chain information between client A and client E from Table 4. The authentication request message sent by the social network server to client E includes the extracted {(A-B, relationship type 2), (B-E, relationship type 1)}; {(A-C, relationship type 2), (C-E, relationship type 1)}. Client E displays the received social relationship chain between client A and client E. Client E can use a form of social relationship authentication message box to receive the authentication request message sent by client A to request to establish the social relationship, and display it in the social relationship authentication message box.

As an alternative, in the step 103, after determining that client B and client C are clients having direct social network with client A, the social network server can directly modify identification information A of the authentication request message sent by client A into identification information B and identification information C without choosing between client B and client C. The modified authentication request message includes the following indication: sending party identification=B and C, textual description="client A requests to join the social network relationship list 1."

The system can also automatically determine and extract a number of pieces of common social attribute information. If the number is 10, which is just beyond a set first threshold 9, the system will automatically add user A into user B's social network relationship list 1. If the number is 5, which is just beyond a set second threshold 4, then the system will automatically add user A into user B's social network relationship list 2.

Figure 3:
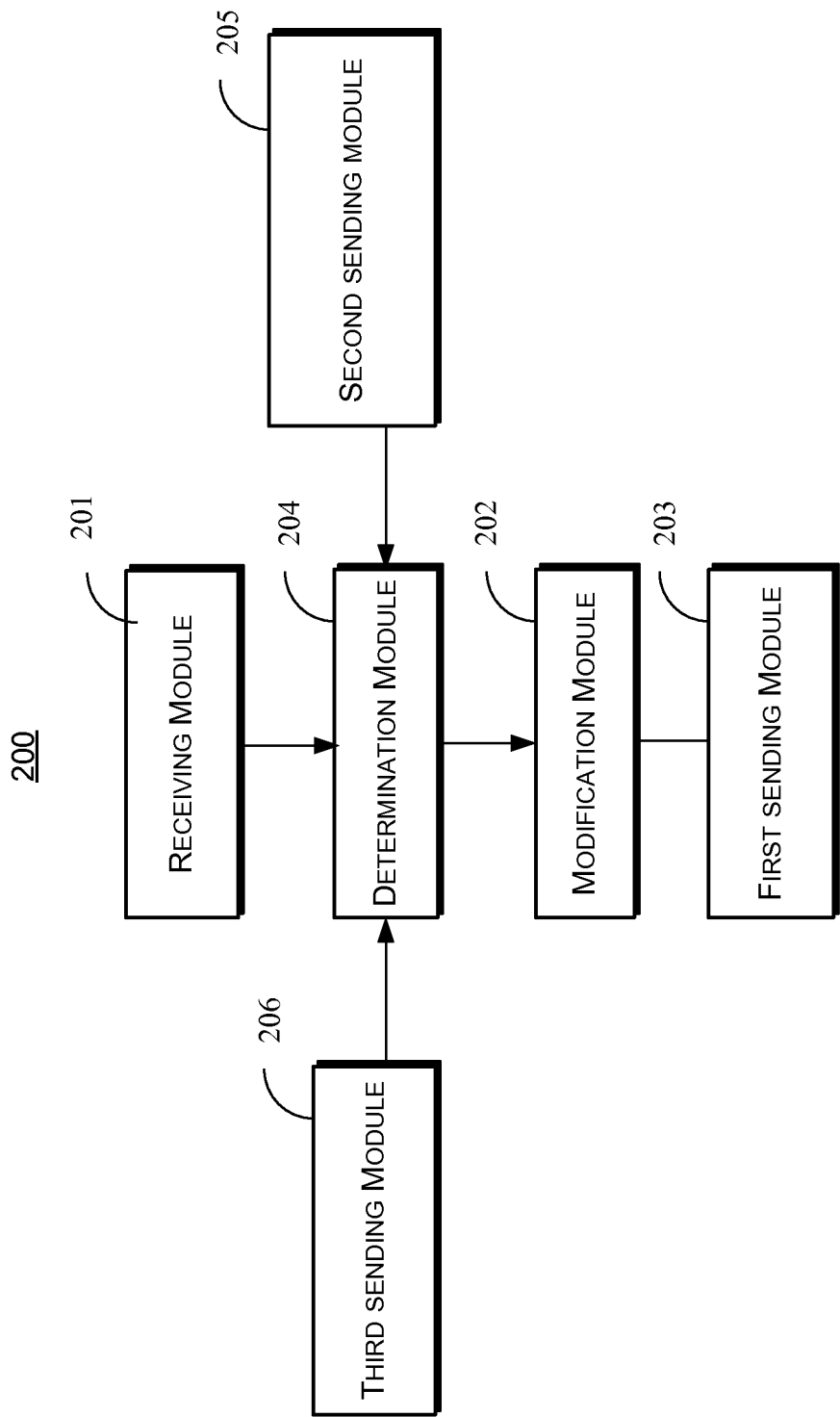
FIG. 3 shows a structure diagram of an apparatus in accordance with a second exemplary embodiment of the present disclosure.

A second exemplary embodiment provided by the present disclosure is an apparatus 200 for sending an authentication request message in a social network. The structure of the apparatus 200 is shown in FIG. 3. Components of the apparatus 200 are described below.

A receiving Module 201 receives a first authentication request message sent by a first client to request to establish a social network relationship with a second client. The first authentication request message includes identification information of the first client.

A modification module 202 modifies the first client identification information to a third client identification information to obtain a second authentication request message. The third client has a social network relationship with the first client and also has a direct social network relationship with the second client.

A first sending module 203 sends the second authentication request message to the second client.

Furthermore, the apparatus 200 also includes a determination module 204 that determines a third client, according to a degree of familiarity with the second client, from clients having a social network relationship with the first client and a direct social network relationship with the second client.

Furthermore, the determination module 204 also determines the third client, according to a degree of familiarity with the first client and a degree of familiarity with the second client, from clients having a direct social network relationship with the first client and a direct social network relationship with the second client.

Furthermore, the determination module 204 also determines the third client that has a maximum degree of familiarity with the second client from clients having a social network relationship with the first client.

Furthermore, the apparatus 200 includes a second sending module 205 that sends to the first client with identification information of all clients having social network relationship with the first client and direct social relation with the second client.

The determination module 204 is also configured to determine the third client according to selection information of the first client.

Furthermore, the apparatus 200 includes a third sending module 206 that sends to the third client the second authentication request message.

The first sending module 203 is also configured to send the second authentication request message to the second client after receiving the third client's responding confirmation message.

A person of ordinary skill in the art can alter or modify the present disclosure in many different ways without departing from the spirit and the scope of this disclosure. Accordingly, if any modifications and variations of the present disclosure fall within the scope of the claims of the present disclosure and its equivalents, the present disclosure includes such modifications and alterations.

What is claimed is:

1. A computer-implemented method for establishing connections, the method comprising:
   receiving, at a computing device including one or more processors and from a user device of a first user, a request for a connection with a second user,
   wherein receipt of the request from the user device causes the computing device to perform acts including:
      determining, using the computing device and based on the request, a third user that has a direct connection with the first user and the second user within a social network, the determining the third user including:
         determining one or more users that have direct connections with the first user and the second user, and
         determining, among the one or more users, the third user based on a degree of familiarity of the third user and the first user, the degree of familiarity being calculated based on a time period during which the third user and the first user have a connection within the social network and a number of times that the third user and the first user exchange messages during a certain time period within the social network,
      providing, using the computing device, a notification associated with the request to the third user, and
      providing, in response to a confirmation of the notification, by the computing device, an additional request for acceptance of the connection from the second user.

2. The computer-implemented method of claim 1, further comprising:
   in response to an acceptance from the second user, causing the connection to be established between the first user and the second user.

3. The computer-implemented method of claim 1, wherein the request includes identification information of the first user and the second user.

4. The computer-implemented method of claim 1, wherein the providing the notification associated with the request to the third user comprises providing the notification to indicate that the first user requests the connection with the second user using identification information associated with the third user.

5. The computer-implemented method of claim 1, wherein the providing the additional request for the acceptance from the second user comprises modifying the request to generate the additional request that includes identification information associated with the third user.

6. The computer-implemented method of claim 5, wherein the additional request further includes social attribute information that is common between the first user and the second user within the social network.

7. The computer-implemented method of claim 5, wherein the additional request further includes one or more users that are common between the first user and the second user within the social network and relationship categories of the one or more users.

8. A system comprising:
   one or more processors; and
   memory to maintain a plurality of components executable by the one or more processors, the plurality of components including:
      a receiving module configured to receive, from a user device of a first user, a request for establishment of a social connection with a second user,
      a modification module configured to determine, based on the request, a third user that has a certain social connection with the first user and the second user, including:
         determining one or more users that have direct connections with the first user and the second user, and
         determining, among the one or more users, the third user based on a degree of familiarity of the third user and the first user, the degree of familiarity being calculated based on a time period during which the third user and the first user have a connection within a social network and a number of times that the third user and the first user exchange messages during a certain time period within the social network,
      a first sending module configured to provide a notification associated with the request to the third user, and
      a second sending module configured to, in response to a confirmation of the notification, provide an additional request for acceptance of the social connection from the second user,
   wherein receipt of the request from the user device causes the modification module to determine the third user.

9. The system of claim 8, wherein the request includes identification information of the first user and the second user.

10. The system of claim 8, wherein the third user has a direct social connection with the first user and the second user,
   wherein the first sending module is further configured to provide the notification to indicate that the first user requests the connection with the second user using identification information associated with the third user, and
   wherein the second sending module is further configured to modify the request to generate the additional request that includes identification information associated with the third user.

11. Non-transitory server memory storing computer-executable instructions that, when executed by one or more processors, instruct the one or more processors to perform acts comprising:
   receiving, from a user device of a first user, a request for a connection with a second user,
   wherein receipt of the request from the user device causes the one or more processors to perform acts including:
      determining, based on the request, a third user that has a connection with the first user and the second user within a social network, the determining the third user including:
         determining one or more users that have direct connections with the first user and the second user, and
         determining, among the one or more users, the third user based on a degree of familiarity of the third user and the first user, the degree of familiarity being calculated based on a time period during which the third user and the first user have a connection within the social network and a number of times that the third user and the first user exchange messages during a certain time period within the social network, providing a notification indicating that the first user requests the connection with the second user using identification information associated with the third user; and providing, in response to a confirmation of the notification, an additional request for acceptance of the connection from the second user.

12. The non-transitory server memory of claim 11, wherein the acts further comprise, in response to the acceptance from the second user, causing the connection to be established between the first user and the second user.

13. The non-transitory server memory of claim 11, wherein the providing the additional request for the acceptance from the second user comprises modifying the request to generate the additional request that includes identification information associated with the third user.

14. The non-transitory server memory of claim 13, wherein the additional request further includes social attribute information that is common between the first user and the second user within the social network.

* * * * *